May 15, 1934.　　　　C. R. GILCHREST　　　　1,959,052
SYSTEM OF MOTOR CONTROL
Filed May 20, 1930
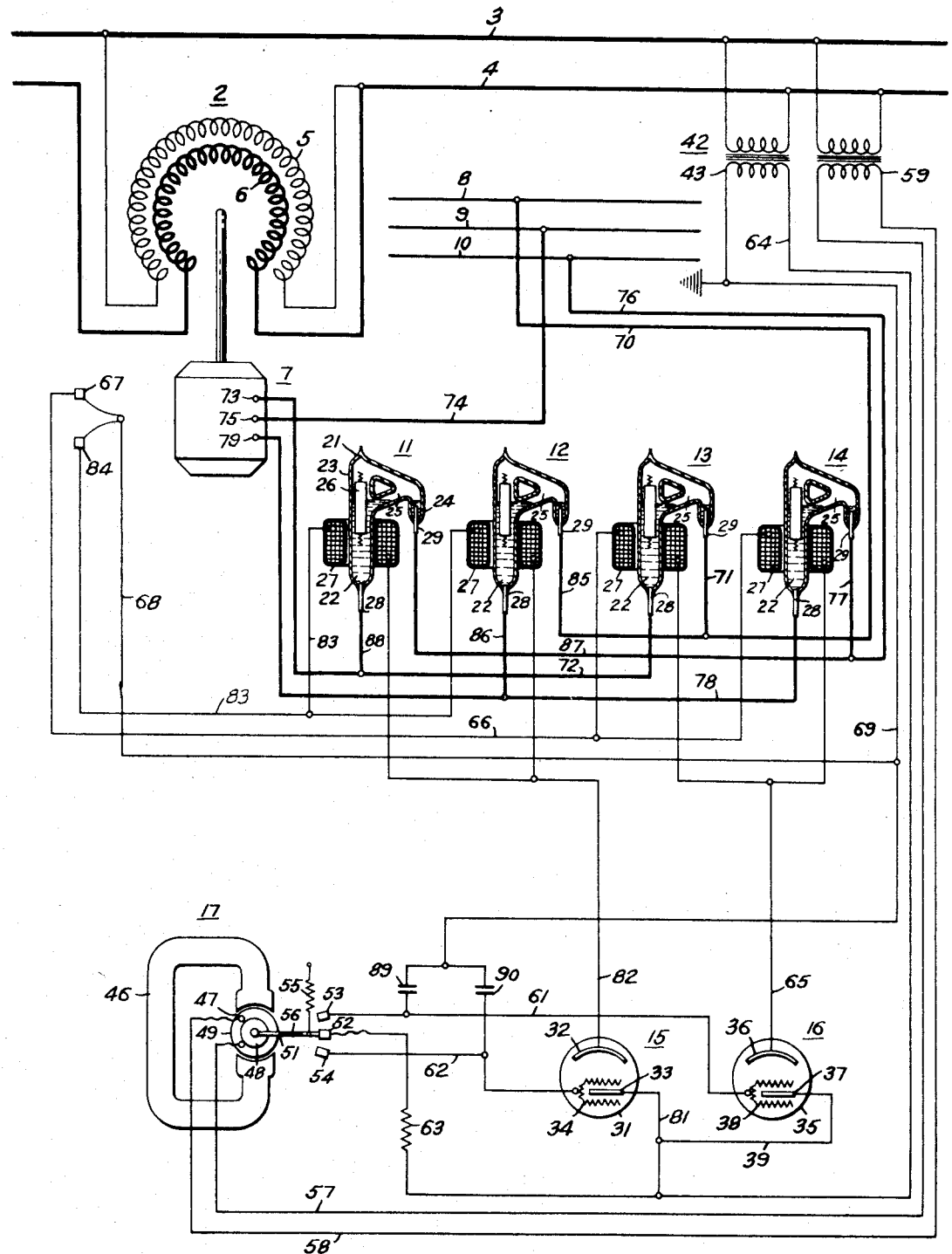
INVENTOR
Clyde R. Gilchrest.
BY
Cherley G. Carr
ATTORNEY Patented May 15, 1934

1,959,052

UNITED STATES PATENT OFFICE

1,959,052

SYSTEM OF MOTOR CONTROL

Clyde R. Gilchrest, Wilkinsburg, Pa.

Application May 20, 1930, Serial No. 453,911

2 Claims. (Cl. 172—179)

My invention relates to systems of motor control wherein directional motor switches are employed and it has special relation to means for controlling the operation of the directional switches to secure operation of the motor in the one or the other direction.

In motor applications, where the operation of the motor in the one or the other direction is necessary, directional or motor-reversing switches are employed to connect the supply conductors to the motor in one of two different motor-operating relations. In certain systems of motor control, the operation of the directional switches is selectively controlled by means of relays of a special type commonly designated as contact-making voltmeters.

Contact-making voltmeters heretofore employed for controlling the operation of directional motor switches are cumbersome, have exposed contacts, require a relatively large amount of energy for their operation and are more expensive than the system of motor control contemplated by this invention.

The object of my invention is to provide a system of motor control, employing directional switches for controlling the direction of rotation of the motor, that shall be reliable, quick in its response to the actuating means, simple in construction, require a minimum amount of energy for its operation and be of low cost.

My invention is illustrated and described as applied to a system of motor control for an induction voltage regulator but it is not limited to this application. It may be employed wherever pilot motors are required, as in power-factor or voltage-regulator systems to control the field excitation of a synchronous condenser or generator; or in temperature-regulating systems for controlling the flow of current to electric furnaces.

My invention will be better understood by reference to the following description and to the accompanying drawing in which the single figure is a diagrammatic view of apparatus and circuits employed in one embodiment of my invention.

Referring to the drawing, an induction regulator 2 is provided for regulating the voltage of a circuit comprising conductors 3 and 4. A primary winding 5 of the regulator 2 is connected in parallel-circuit relation and a secondary winding 6 is connected in series-circuit relation to the conductors 3 and 4 of the circuit to be regulated. A motor 7 is provided for changing the relative positions of the primary and secondary windings of the induction regulator. The motor 7, which is illustrated as a three-phase alternating-current motor, is energized from auxiliary supply conductors 8, 9 and 10.

The motor 7 is controlled in accordance with the operation of two groups of circuit-controlling or directional motor switches 11 and 12, and 13 and 14 that are selectively energized by the operation of electric-discharge devices or grid-glow tubes 15 and 16 that are, in turn, controlled by a voltmeter 17, equipped with condenser plates or contacts, that establishes grid-leak paths for the tubes 15 and 16. The voltmeter 17 is actuated in accordance with variations of the voltage of the circuit being regulated from a desired value.

The motor-operating switches 11, 12, 13 and 14 are of the liquid type comprising a glass housing 21 containing a conducting liquid 22, such as mercury, and having an elongated section 23 and a shorter parallel section 24 connected together by a constricted section 25. A member 26 of magnetizable material, adapted to float on the liquid, is placed in the elongated section 23 and acts as an armature member for the winding 27 that surrounds the elongated section 23. Terminal members 28 and 29 extend through the walls of the sections 23 and 24, respectively, in such manner as to make contact with the conducting liquid.

The windings 27 of the directional switches 11 and 12 are so connected, in parallel-circuit relation, that they will be energized simultaneously to close a circuit for effecting the operation of the motor 7 in one direction. The windings 27 of the directional switches 13 and 14 are also connected to be similarly energized to close a circuit for effecting the operation of the motor 7 in the opposite direction.

The electric-discharge device 15 comprises an envelope 31 in which are positioned a cathode 32, an anode 33 and a grid element 34 substantially surrounding the anode. The envelope is filled with inert gas, such as argon or neon, under a pressure of approximately one one-hundredth of a millimeter of mercury. The electric discharge device 16 is similar to the device 15, comprising an envelope 35 having positioned therein a cathode 36, an anode 37 and a grid element 38, the anode 37 being connected to the anode 33 by a conductor 39.

For a given impressed voltage between the anode and the cathode of the tube 15 or the tube 16, and for a given rarification of the gas within the tube, the gas will become ionized sufficiently to permit an appreciable current to pass through the space between the cathode and the anode, providing no force is present to oppose such flow of current. When the grid 34 or the grid 38 is left free to assume any potential, it will acquire a negative charge when alternating voltage is applied to the terminals of the tube, which charge acts to oppose ionization of the gas within the envelope. A much greater voltage is then required between the anode and the cathode to ionize the gas in the space between these elements and permit current to flow.

The tubes 15 and 16 are of such design, that, for the voltage impressed across the terminals 32 and 33, or across terminals 36 and 37, by a transformer 42 energized from the conductors 3 and 4, current will not flow through the tube when a negative charge exists on the grid but will flow when the negative charge is removed.

I prefer to employ an electric-discharge device of the type disclosed and claimed in the copending application of Dewey D. Knowles, Serial No. 149,290, filed November 19, 1926, and assigned to the Westinghouse Electric and Manufacturing Company. The electric-discharge device of the type disclosed in the Knowles application, above referred to, has the property of becoming conductive when a self-acquired negative grid charge is dissipated. It is to be understood, however, that any similar device having the same property as the device disclosed in the Knowles application may be employed without interfering with the practice of my invention.

The electric-discharge device 15 is connected in series-circuit relation to the parallel-connected windings 27 of the directional switches 11 and 12 to control the energization thereof by means of a circuit from the secondary windings 43 of the potential transformer 42, which impresses an alternating-current potential across the anode 33 and the cathode 32 of the discharge device 15.

Similarly, an alternating-current potential is impressed across the anode 37 and the cathode 36 of the electric-discharge device 16 by the potential transformer 42. This device completes a circuit through the windings 27 of the directional switches 13 and 14 to control the energization thereof.

The voltmeter 17 comprises a permanent magnet 46, of substantially rectangular shape, having an air gap 47 in which an armature 48, having a winding 49 disposed thereon, is rotatably mounted. The armature 48 is provided with an arm 51 having a contact member or movable condenser plate 52 affixed at its end, that cooperates with two stationary contact members or condenser plates 53 and 54. A biasing member, in the form of a spring 55, is provided for normally biasing the arm 51 in a direction to cause engagement of the contact members 52 and 53. The energization of winding 49 causes the armature to be biased against the action of the spring 55. The portion 56 of the arm 51 is made of insulating material in order to insulate the contact member 52 from the armature 48. The armature winding 49 is connected, by conductors 57 and 58, to a potential transformer 59 to be energized in accordance with the voltage across the conductors 3 and 4. The movable element of the voltmeter 17 is of very light construction, thereby requiring very little energy to actuate it and it is very sensitive to changes in voltage of the circuit 3—4.

The stationary contact member 53 is connected, by means of a conductor 61, to the grid element 38 of the electric-discharge device 16, and the stationary contact member 54 is connected, by means of a conductor 62, to the grid element 34 of the electric-discharge device 15. The movable contact member 52 is connected, through a grid leak resistance 63, to the conductor 39 that connects the two anodes 33 and 37 together. It will be noted that, when the contact member 52 engages either of the contact members 53 and 54, establishing grid-leak paths for the grid members 38 and 34, respectively, the potential of the grid will be substantially the same as the potential of the anode. To limit the flow of current in the grid-leak circuit, the grid-leak resistance should be of the order of at least one megohm.

The operation of my system is as follows:

As explained in the copending application of Knowles, previously referred to, the grid members 34 and 38 of the electric-discharge devices 15 and 16, respectively, tend to accumulate a high negative charge when an alternating-current potential is applied between the anode and the cathode of each device. The high negative charge acquired by each of the grid members 34 and 38 is sufficient to prevent the flow of current between the cathode and the anode of the electric-discharge devices 15 and 16 by limiting the ionization of the gas in the space between the anode and the cathode and preventing it from becoming conductive.

If the voltage of the circuit 3—4 decreases with respect to its desired value, the torque developed by the armature 48 will be insufficient to overcome the pull of the biasing member 55. The armature 48 will, therefore, rotate, and the contact member 52 will engage the contact member 53, thereby providing a leakage path for the grid member 38 of the discharge device 16. The grid member 38 will then have a potential essentially that of the anode 37, and the electric discharge device 16 will be conductive, thereby completing a circuit that energizes the windings 27 of the directional switches 13 and 14 by connecting them to the secondary winding 43 of the potential transformer 42. The energizing circuit for the windings 27 of the switches 13 and 14 extends from one side of the secondary winding 43 of the potential transformer 42, through conductor 64, conductor 39, anode 37, cathode 36, conductor 65, through the parallel connected windings 27 of the directional switches 13 and 14, through conductor 66, limit switch 67, conductor 68, and through conductor 69, to the other side of the secondary winding 43 of the potential transformer 42.

The energization of the windings 27 of the directional switches 13 and 14 causes the floating members 26 to be drawn downwardly, displacing a part of the liquid 22 which passes through the constricted passage 25 and electrically connects the terminal members 28 and 29, thereby connecting the supply conductors 8, 9 and 10 to the three phases of the motor 7, causing it to operate in one direction. The motor circuit extends from supply conductor 8, through conductor 70, conductor 71, the directional switch 13 and conductor 72, to one phase of the motor represented by the terminal 73; from the supply conductor 9, through conductor 74, to another phase of the motor 7 represented by the terminal 75; from supply conductor 10, through conductor 76, conductor 77, the directional switch 14 and conductor 78, to the third phase of motor 7 represented by the terminal 79. The operation of motor 7 changes the position of the winding 5 relatively to winding 6 in a direction to increase the voltage on the circuit 3—4 to its desired value.

If the voltage of the circuit 3—4 increases above its desired value, the torque developed by the armature 48 will be sufficient to overcome the effect of the biasing member 55, the armature 48 will rotate, and the contact member 52 will engage the contact member 54, thereby providing a leakage path for the grid element 34 of the electric-discharge device 15. The grid element 34 will then have essentially the same potential as that of the anode 33, and the electric discharge device 15 will be conducive, thereby completing a circuit that energizes the windings 27 of the directional switches 11 and 12 by connecting them to the secondary winding 43 of the potential transformer 42. This energizing circuit extends from the secondary winding 43 of the potential transformer 42, conductor 64, conductor 81, the anode 33, cathode 32, conductor 82, through the parallel-connected operating windings 27 of the directional switches 11 and 12, conductor 83, limit switch 84, conductor 68 and conductor 69, to the other side of the secondary winding 43 of the potential transformer 42.

The energization of the windings 27 will actuate the directional switches 11 and 12 in the manner heretofore described, thereby connecting the supply conductors 8 and 10 to the terminals 79 and 73 of the motor 7 in the reversed order from the previously described connection. This motor circuit extends from supply conductor 8, through conductor 70, conductor 85, directional switch 12, conductor 86 and conductor 78, to the terminal 79; from the supply conductor 9, through conductor 74, to the terminal 75, from the supply conductor 10, through conductor 76, conductor 87, directional switch 11, conductor 88 and conductor 72, to the terminal 73. The motor 7 will now operate in the opposite direction, thus changing the position of winding 5 relatively to winding 6 to make the necessary correction to maintain the voltage of the circuit 3—4 at the desired value.

In order to insure stable operation of the system a small condenser 90 is connected between the grid element 34 and the cathode side of the potential transformer 42, thus preventing the grid potential from varying too greatly from that of the cathode 32, in which case, a small leakage from the grid might cause the electric-discharge device 15 to operate. Similarly, a condenser 89 is connected across the grid element 38 of the electric-discharge device 16 and the cathode side of the potential transformer 42.

It will be evident from the above description that I have provided a system of motor control for controlling the direction of rotation of a motor that is reliable and quick in its operation, simple in its construction and that will require only a small amount of energy for its operation.

Since many modifications may be made in the apparatus and circuits illustrated without departing from the spirit of my invention, I do not wish to be limited otherwise than by the scope of the appended claims.

I claim as my invention:

1. In a motor-control system, a motor, electro-responsive switching means for controlling the operation of said motor in the one or the other direction, means for controlling the operation of said switching means comprising a plurality of tube relays each having an anode, a cathode, and a grid, said grid normally preventing the flow of current through the tube between the cathode and the anode, means for connecting the grid, through a small condenser, to the tube cathode, and means for rendering the grid ineffective to prevent the flow of current through the tube.

2. In a motor-control system, a motor, electro-responsive switching means for controlling the operation of said motor in the one or the other direction, means for controlling the operation of said switching means comprising a plurality of tube relays each having an anode, a cathode and a grid, means for impressing an alternating voltage between said anode and cathode, said grid acquiring a negative charge thereby which acts to prevent the flow of current through the tube between the cathode and the anode, means for connecting the grid, through a small condenser, to the tube cathode, and means for removing the charge from the grid, thus permitting the flow of current through the tube.

CLYDE R. GILCHREST.